Patented Nov. 7, 1939

2,178,593

UNITED STATES PATENT OFFICE 2,178,593

FOOD CONCENTRATE OF PAPAYA

Leroy Leon Matoush, New York, N. Y., assignor to Papaya Corporation of America, New York, N. Y., a corporation of New York No Drawing. Application March 24, 1937, Serial No. 132,741. Renewed January 23, 1939

11 Claims. (Cl. 99—155)

My invention relates to the treatment of the Carica papaya, a fruit which is indigenous to the tropics and may be grown in certain semi-tropical localities, and has for its object to provide a method of treating the fruit whereby a stable commercial product may be obtained having a high food and therapeutic value. Another object of my invention is to produce a concentrate of papaya which will serve as a base for combinations with other more or less solid foods and with fruits and liquids used for human consumption.

To these and other ends my invention contemplates the treatment of the fruit in a novel manner to produce a new product having a wide variety of uses all as will be further described in the following specification, and set forth particularly in the appended claims.

Papaya is a melon-like fruit exceptionally rich in a number of different vitamins which are recognized as important food constituents but, because it is a fruit that only ripens satisfactorily on the tree and which when it reaches maturity cannot be preserved by any practical means which will permit its shipment over any great distance, its use as a food has heretofore been limited to its natural state in the localities where grown.

One of the objects of my invention is to utilize both the body portion or pulp of the fruit which is known to contain vitamins A, B, C, D and G in combination with the liquid derived therefrom which in addition to water carries carbohydrates, proteins and fats. However, in order to make a stable compound, it is necessary to first separate the fluid from the pulp in a manner which permits a desired portion of the pulp to be retained with the liquid and retained more or less in suspension therein. This step in the process follows first a thorough cleaning of the fruit exteriorly and washing it in an antiseptic bath to kill mold, after which the fruit is cut and crushed after the seeds are removed.

I transfer the crushed mass from the crusher to the rotatable basket of a centrifugal extracting machine, the periphery of which is composed of a fine screen which may vary from 60 mesh where a heavier or thicker product more in the nature of a syrup is desired which will be used for toppings in soda fountain drinks or sundaes, to 100 mesh where the product itself is intended to be used as the base for refreshing drinks.

The seeds obtained from the fruit are treated separately and from them I obtain an ingredient, the exact nature of which I have not as yet been able to determine or classify organically. From my work in the commercial development of my invention, I have, however, ascertained that chemically it is in the nature of an enzyme which when further treated serves as the preservative or stabilizer of the juice-pulp extract obtained as above described. The seeds are ground to a powder and to this is added a weak citric acid which I prefer to obtain by the use of juice obtained from limes in the proportion of two parts of lime juice to one part of the seed powder. These proportions are usually sufficient to make a thin paste which should be beaten for a sufficient length of time to allow the powder to thoroughly absorb the fruit acid. For example, I recommend the treating of these two elements for a period of at least fifteen minutes in a mechanical mixer. Upon completion of this operation, the mixture is passed through a filter press to remove all insoluble matter. The resultant liquor has been found, from exhaustive tests, to preserve the juice and/or pulp extracted from the fruit against spoiling indefinitely under varying conditions of temperature, climate and exposure. This preservative ingredient obtained by treatment of the seeds is added to the juice-pulp extract preferably immediately after its extraction but at the latest before it has begun to gel. The product described may be used directly as a drink or in the preparation of foods for the table, or it may be combined with grapefruit juice or orange juice and sweetened to taste.

For practical purposes it may be considered that in the final product the quantities of the filtered acidized seed component and the fruit juice-pulp extract are in the same proportions as they exist in the natural fruit, although I have found that, while these proportions seem to be nicely balanced in the natural fruit, it is possible to vary one constituent or the other within moderate limits without producing noticeable effects in the final product either in its keeping qualities or in its value as a food.

In the different operations in handling the papaya beginning with the first cutting of the fruit, the crushing and straining, the metal surfaces with which it comes in contact should be non-corrodible and of such material as stainless steel of Monel metal.

I claim:

1. A food product comprising the juice and a portion of the pulp of papaya fruit to which is added an acidified liquor obtained from the treatment of papaya seeds with a weak acid.

2. A food product comprising papaya fruit juice and fruit pulp combined with an acidized liquor obtained by treatment of the papaya seeds with an organic acid.

3. A food product comprising papaya fruit juice and a small percentage of the fruit pulp combined with a liquor obtained by treating crushed papaya seeds with a weak fruit acid.

4. A papaya fruit derivative consisting of the fruit juice and a relatively small quantity of the pulp in combination with a stabilizing liquor derived by treatment of the papaya seeds with citric acid.

5. A papaya fruit derivative consisting of the fruit juice and a portion of finely divided fruit pulp therein and a stabilizing liquor obtained by treating crushed papaya seeds with a weak acid.

6. A papaya fruit product comprising the fruit juice and a small portion of finely divided fruit pulp held in suspension in the juice and a stabilizing element obtained by treating crushed papaya seeds with a weak acid and filtering the resultant liquor.

7. The method of producing a stabilized food product from papaya fruit consisting in separately crushing the fruit and seeds, extracting the fruit juice, treating the seeds with a weak acid and finally mixing the resulting liquor with the fruit juice.

8. The method of producing a stabilized papaya food product consisting in separately crushing the fruit and the seeds, extracting the fruit juice and combining the same with a relatively smaller portion of the fruit pulp, treating the seeds with a weak acid, filtering off the resultant liquor and finally admixing the liquor with the juice-pulp extract.

9. The method of producing a stabilized papaya food product consisting in separately crushing the fruit and the seeds, extracting the fruit juice and combining the same with a relatively smaller portion of the fruit pulp, acidizing the seed pulp by stirring into it a relatively larger quantity of a weak acid, filtering off from said seed pulp the resulting liquor and finally admixing it with the juice-pulp extract.

10. A papaya food product comprising a juice-pulp extract of papaya fruit containing as a preservative a product obtained by treatment of ground papaya seeds with a weak potable acid.

11. The method of producing a stabilized papaya food product which comprises extracting the juice and a portion of the pulp from papaya fruit and adding to said extract as a preservative a product obtained by treatment of ground papaya seeds with a weak potable acid.

LEROY LEON MATOUSH.